US009786256B2

(12) United States Patent
Zheng et al.

(10) Patent No.: US 9,786,256 B2
(45) Date of Patent: Oct. 10, 2017

(54) METHOD AND DEVICE FOR GENERATING GRAPHICAL USER INTERFACE (GUI) FOR DISPLAYING

(71) Applicant: MediaTek Singapore Pte. Ltd., Singapore (SG)

(72) Inventors: Zijie Zheng, Shenzhen (CN); Cheng Chen, Shenzhen (CN); Chenli Zhang, Shenzhen (CN)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 99 days.

(21) Appl. No.: 14/592,177

(22) Filed: Jan. 8, 2015

(65) Prior Publication Data

US 2015/0193906 A1 Jul. 9, 2015

(30) Foreign Application Priority Data

Jan. 8, 2014 (CN) .......................... 2014 1 0008802

(51) Int. Cl.

*G06T 1/20* (2006.01)
*G09G 5/393* (2006.01)
*G09G 5/14* (2006.01)
*G09G 5/36* (2006.01)

(52) U.S. Cl.

CPC ............... *G09G 5/393* (2013.01); *G09G 5/14* (2013.01); *G09G 5/363* (2013.01); *G09G 2354/00* (2013.01); *G09G 2360/06* (2013.01)

(58) Field of Classification Search

None

See application file for complete search history.

(56) References Cited

U.S. PATENT DOCUMENTS 7,636,097 B1 * 12/2009 Holloway ............. G06T 11/203 345/611
8,994,750 B2 * 3/2015 Belanger ................. G06T 11/00 345/629
2004/0179017 A1 * 9/2004 Martyn .................... G09G 5/14 345/536
2010/0058229 A1 3/2010 Mercer
2011/0102316 A1 * 5/2011 Tsai ...................... G06F 9/4443 345/156
2011/0292048 A1 * 12/2011 Chien ..................... G06T 15/04 345/426
2013/0236125 A1 9/2013 Kim
2013/0328922 A1 12/2013 Belanger

FOREIGN PATENT DOCUMENTS

CN 103310761 A 9/2013

* cited by examiner

*Primary Examiner* — Yingchun He

(74) *Attorney, Agent, or Firm* — McClure, Qualey & Rodack, LLP

(57) ABSTRACT

Methods and devices for generating Graphical User Interface (GUI) for displaying are provided, wherein the GUI is generated based on a plurality of windows. The method for generating GUI includes the step of: separately drawing a plurality of pictures into the plurality of windows by a first graphical processing unit; and selecting the first graphical processing unit or a second graphical processing unit according to a predefined rule to compose the plurality of windows with pictures into a frame buffer, such that the GUI is obtained; wherein the first graphical processing unit and the second graphical processing unit are different.

10 Claims, 10 Drawing Sheets

METHOD AND DEVICE FOR GENERATING GRAPHICAL USER INTERFACE (GUI) FOR DISPLAYING

CROSS REFERENCE TO RELATED APPLICATIONS

This application claims priority of China Patent Application No. 201410008802.7, filed on Jan. 8, 2014, the entirety of which is incorporated by reference herein.

BACKGROUND OF THE INVENTION

Field of the Invention

The invention generally relates to display technology, and more particularly, to a method and device for generating graphical user interface for displaying.

Description of the Related Art

Graphical User Interface (hereinafter referred to as GUI) refers to the user interface that generates graphics for displaying. Generation of the GUI can give users better visual enjoyment.

Currently, displaying of a GUI on the screen can be achieved by first creating multiple windows, and then using a graphical processing unit (hereinafter referred to as GPU) to draw pictures into the plurality of windows, followed by composing the windows drawing with the pictures in the buffers by using the composition function of the GPU, and finally displaying the GUI on the screen through the on screen display (OSD).

In currently existing technologies, whether drawing pictures or composing them, the graphic processing resources of the GPU are needed. At the same time, with the progressive development in science and technology, image resolution continues to improve. An increase in resolution means more graphic processing resources from the GPU are consumed, thus the heavier load on the GPU during processing. Specifically, when there is an increase in picture resolution, the performance of picture processing of the GPU decreases, thus leading to a rapid drop in the frame rate of the GUI output on the screen. The frames on the display will show discontinuity and unsmooth flow as seen by the human eye.

For example, when the picture resolution is 4K2K ultra HD (3840×2160) (i.e. when the total pixel amount of the picture to be processed reaches higher than 8 million), through tests, the frame rate of the GUI output on the screen obtained is 12 fps (the number of frames per second). Due to the special physiological structure of the human eye, when the frame rate of frames is higher than 24 fps, the frames are seen as continuous frames. When this happens, since the frame rate of the GUI is much lower than 24 fps, the human eye will see intermittently displayed GUI, thus seriously affecting the user's visual experience.

BRIEF SUMMARY OF THE INVENTION

Accordingly, embodiments of the invention provide the following technology.

In accordance with one embodiment of the present invention, the present invention provides a method for generating a Graphical User Interface (GUI) for displaying, wherein the GUI is generated based on a plurality of windows, the method comprises:

separately drawing a plurality of pictures into the plurality of windows by a first graphical processing unit (GPU); and selecting the first GPU or a second GPU according to a predefined rule to compose the plurality of windows drawing with the pictures into a buffer, such that the GUI is obtained; wherein the first GPU and the second GPU are different.

In accordance with another embodiment of the present invention, the present invention provides a device for generating Graphical User Interface (GUI) for displaying, the device comprises:

a first graphical processing unit (GPU) for separately drawing a plurality of pictures for generating the GUI into a plurality of windows; a second GPU; and a buffer which is coupled to the first GPU and the second GPU; a window management module for selecting the first GPU or the second GPU according to a predefined rule to compose the plurality of windows drawing with the pictures into the buffer, wherein the first graphical processing unit and the second graphical processing unit are different.

In accordance with yet another embodiment of the present invention, the present invention provides a device for generating a Graphical User Interface (GUI) for displaying, the device comprising:

a first graphical processing unit (GPU), separately drawing a plurality of pictures for generating the GUI into a plurality of windows; and a buffer which is coupled to the first GPU; wherein at least one of the windows is stored in the buffer and the first GPU composes the windows drawing with the pictures stored in the buffer and remaining windows to generate the GUI.

In accordance with yet another embodiment of the present invention, the present invention provides a method for generating a Graphical User Interface (GUI) for displaying, wherein the GUI is generated based on a plurality of windows, the method comprising:

separately drawing a plurality of pictures into the plurality of windows by a first graphical processing unit (GPU); and selecting at least one of the first GPU, a second GPU and a third GPU according to a predefined rule to compose the plurality of windows drawing with the pictures into a buffer, wherein the first GPU, the second GPU and the third GPU are different from each other.

In accordance with yet another embodiment of the present invention, the present invention provides a device for generating a Graphical User Interface (GUI) for displaying, the device comprising:

a first graphical processing unit (GPU) for separately drawing a plurality of pictures for generating the GUI into a plurality of windows; a second GPU;

a third GPU; and a buffer which is coupled to the first GPU, the second GPU and the third GPU; and a window management module, selecting at least one of the first GPU, the second GPU and the third GPU according to a predefined rule to compose the plurality of windows drawing with the pictures into a buffer, wherein the first GPU, the second GPU and the third GPU are different from each other.

The beneficial effects of the embodiments are: compared with the prior art, methods and devices for generating a GUI for displaying of the present invention can reduce the processing load of the first GPU and enhancing the performance of picture processing so as to increase the frame rate for displaying the GUI, and allow the human eye to see continuous and smooth flowing frames on the screen.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The disclosure and the patent claims use certain words to refer to a particular component. It is understood by ordinary skill in the art that, manufacturers may use different terms to refer to the same component. The disclosure and the claims are not to distinguish between the components in differences in the names, but rather in differences in the functions of the components. The term "coupling" mentioned throughout the disclosure and the claims includes any direct and/or indirect means of electrical coupling. Therefore, if a first device is described as coupled to a second device, it means that the first device is either electrically coupled to the second device directly, or electrically coupled to the second device indirectly through other devices or electric coupling means. The invention can be more fully understood by reading the subsequent detailed description and examples with references made to the accompanying drawings. The following description is of the best-contemplated mode of carrying out the invention. This description is made for the purpose of illustrating the general principles of the invention and should not be taken in a limiting sense. The scope of the disclosure is best determined by reference to the appended claims.

Figure 1:
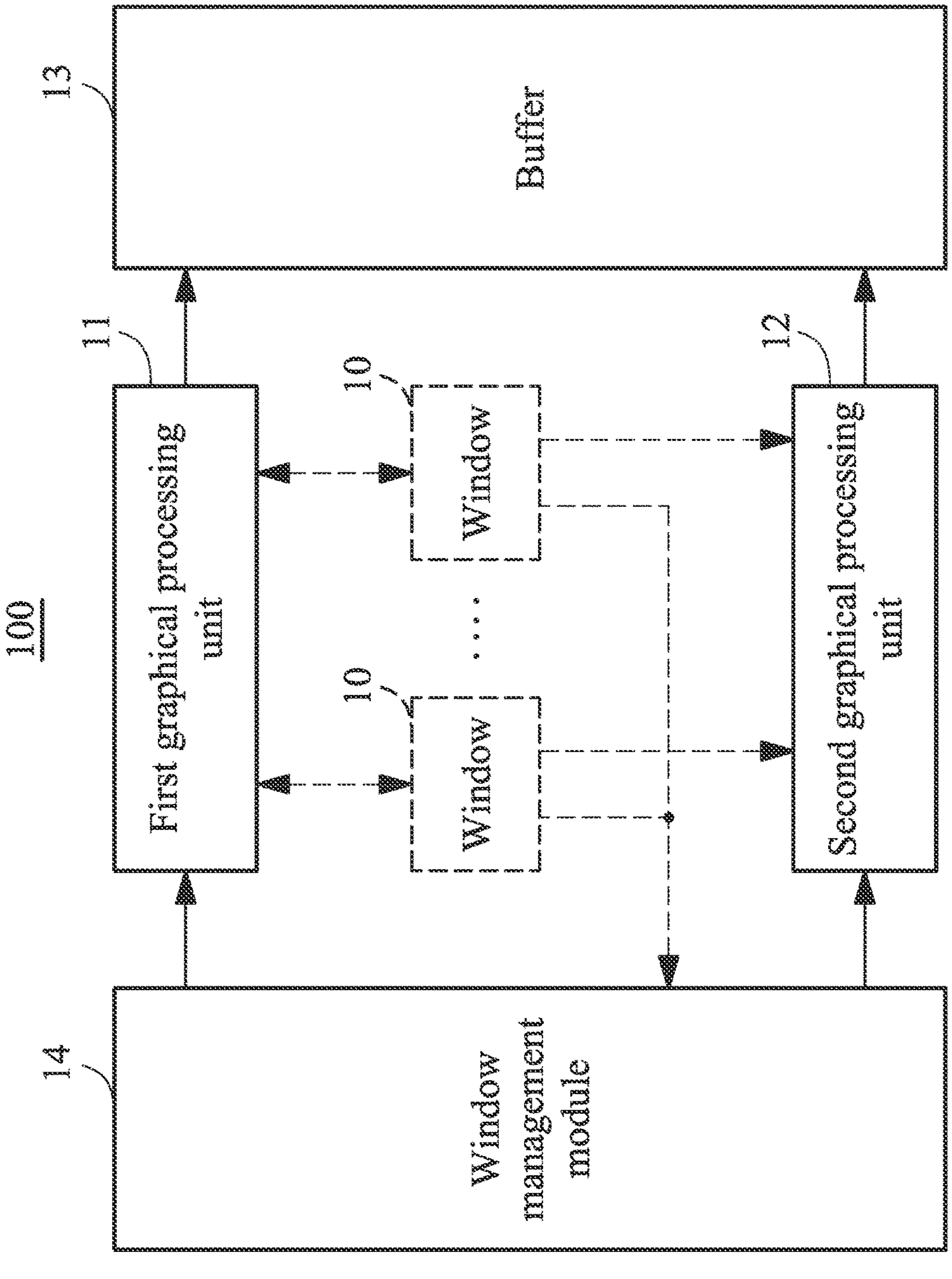
FIG. 1 is a schematic diagram illustrating a structure of a device for generating GUI for displaying according to the first embodiment of the invention.

FIG. 1 is a schematic diagram illustrating a structure of a device for generating GUI for displaying according to the first embodiment of the invention. As shown in FIG. 1, the device 100 for generating GUI for displaying comprises a first GPU 11, a second GPU 12, a buffer 13 and a window management module 14. In addition, the dotted line in FIG. 1 identifies a plurality of windows 10 which can carry pictures for generating the GUI. It should be noted that the buffer 13 is coupled to the first GPU 11 and the second GPU 12. For example, the buffers 13 are physical buffers (hardware buffers) and the window management module 14 is an Android system-based Surfaceflinger. One of the buffers 13 is an Android system-based frame buffer. In another example, the buffers 13 are not limited to physical buffers with continual physical addresses.

The first GPU 11 separately draws a plurality of pictures into the windows 10, wherein the windows 10 were created by an application in which each window is a virtual window which corresponds to a virtual memory space accessed by the corresponding virtual address. More specifically, the windows 10 can be generated by the application calling the corresponding interfaces of the window manager based on requirement. The GUI is typically generated by mixing multiple-layers pictures, wherein the number of layers for the pictures in the GUI corresponds to the number of windows. The step that the first GPU 11 separately draws the pictures for generating the GUI into the windows 10 can be achieved by: the first GPU writes the value of each pixel of the picture in each layer of the GUI into a virtual memory space corresponding to the respective window. The window management module 14 is coupled to the first GPU 11 and the second GPU 12, and the window management module 14 manages the windows 10 for selecting the first GPU 11 or the second GPU 12 according to a predefined rule to compose the windows 10 drawing with pictures into the buffer 13, wherein the buffer 13 is a physical storage device with continuous physical address, which can directly read and write the stored content through the address and data bus to generate the GUI for displaying.

To be more specific, if a plurality of windows are respectively recorded as the first window, the second window, the $n^{th}$ window, etc., the first GPU or the second GPU will copy the value of each pixel point in the pictures stored in the respective virtual memory space of the first window to the physical memory space of the corresponding buffer; separately compose the value of each pixel point in the pictures stored in the respective virtual memory space of the second window and the value of each pixel point in the first window which has already stored in the buffer and continually stores the composition result to the buffer; separately composes the value of each pixel point in the pictures stored in the respective virtual memory space of the third window and the value of each pixel point after the first window and the second window have been composed which has already stored in the buffer and continually stores the composition result to the buffer; . . . and so on, until the completion of the compose operation of the $n^{th}$ window. The GUI stored in the buffer will then be generated to be further displayed on the screen through the OSD.

In particular, the predefined rules may be set in advance based on the status of the first GPU and the second GPU or based on the attributes of the plurality of windows. For example, the predefined rules can be specifically divided into four types, as follows:

First type: the second GPU 12 is selected to compose the windows 10 drawing with pictures.

Second type: the window management module 14 determines whether a utilization of the first GPU 11 has exceeded a predetermined threshold (e.g. the predefined threshold value is set to be a value of 95%). If the utilization of the first GPU has exceeded the predetermined threshold, the second GPU 12 is selected to compose the windows 10 drawing with the pictures.

Third type: the window management module 14 separately obtains window sizes of the windows 10 drawing with the pictures and selects the first GPU 11 or the second GPU 12 to compose the windows 10 drawing with the pictures according to the obtained window sizes of the windows 10.

Fourth type: the window management module 14 separately obtains layer attributes of the windows 10 drawing with the pictures, wherein the layer attributes indicate a layer relationship of the windows 10 and then selects the first GPU 11 or the second GPU 12 to compose the windows 10 drawing with the pictures according to the obtained layer attributes of the windows 10.

When the first type of the predefined rule is selected, the detail process for GUI displaying can be that the first GPU 11 separately draws the pictures for generating the GUI into the windows 10 and the second GPU 12 composes the windows 10 drawing with the pictures into the buffer 13 so as to generate the GUI. Note that the first GPU is a three-dimensional GPU (hereinafter referred to as the 3D GPU) and the second GPU is a two-dimensional GPU (hereinafter referred to as the 2D GPU).

When the second type of the predefined rule is selected, the detail process for GUI displaying can be that the first GPU 11 separately draws the pictures for generating the GUI into the windows 10 and then the window management module 14 determines whether a utilization of the first GPU 11 has exceeded a predetermined threshold. When the window management module 14 determines that the utilization of the first GPU 11 has exceeded the predetermined threshold, the first GPU 11 composes the windows 10 drawing with the pictures into the buffer 13 so as to generate the GUI. Note that the first GPU is a 3D GPU and the second GPU is a 2D GPU.

When the third type of the predefined rule is selected, the detail process for GUI displaying can be as follows: for example, when the windows 10 comprise two windows, the first GPU 11 separately draws the pictures for generating the GUI into the two windows. Then, the window management module 14 separately obtains window sizes of the two windows drawing with the pictures, marks the two windows as a first window and a second window based on the window sizes of the two windows from large to small. After that, the window management module 14 selects the second GPU 12 to copy the first window to the buffer 13 and select the first GPU 11 to compose the second window and the first window copied into the buffer 13 to generate the GUI. Note that the first GPU is 3D GPU and the second GPU is a graphical-scaling processing unit (hereinafter referred to as the IMGRZ) or 2D GPU.

When the fourth type of the predefined rule is selected, the detail process for GUI displaying can be as follows: for example, when the windows 10 comprise two windows, the first GPU 11 separately draws the pictures for generating the GUI into the two windows. Then, the window management module 14 separately obtains the layer attributes of the two windows drawing with the pictures and sequentially marks the two windows as a lower-layer window and an upper-layer window according to the order of the layer attributes from bottom to top, or sequentially marks the two windows as a lower-layer window and an upper-layer window based on whether the layer attribute is relative to a background layer (e.g. wallpaper) or a dynamic picture (which usually updates in real-time), wherein lower-layer window corresponds to the background layer and the upper-layer window corresponds to the dynamic picture. After that, the window management module 14 selects the second GPU 12 to copy the lower-layer window to the buffer and selects the first GPU 11 to compose the upper-layer window and the lower-layer window copied into the buffer to generate the GUI. Note that the first GPU is 3D GPU and the second GPU is IMGRZ or 2D GPU.

Figure 2:
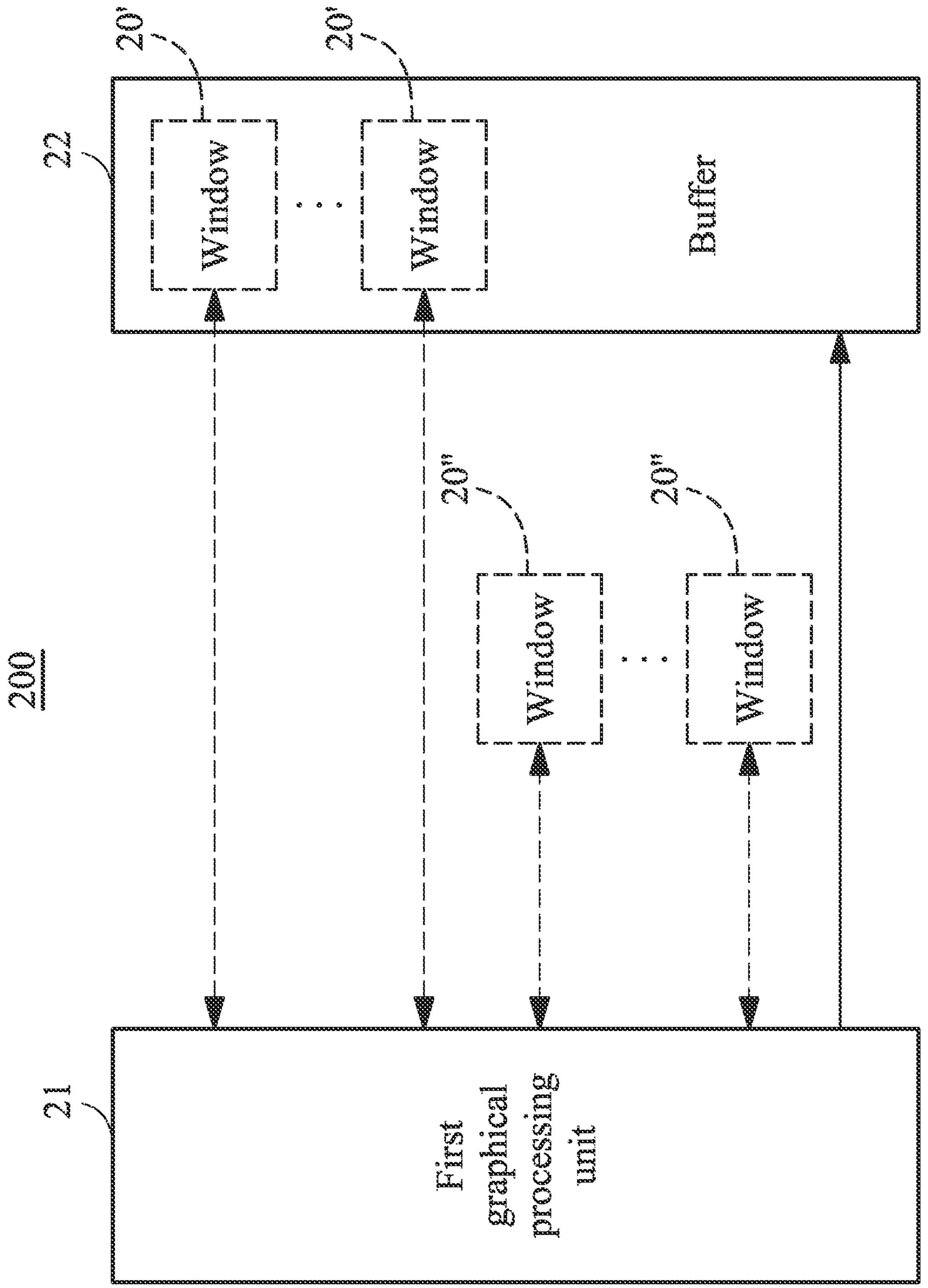
FIG. 2 is a schematic diagram illustrating a structure of a device for generating GUI for displaying according to the second embodiment of the invention.

FIG. 2 is a schematic diagram illustrating a structure of a device for generating GUI for displaying according to the second embodiment of the invention. As shown in FIG. 2, the device 200 for generating GUI for displaying comprises a first GPU 21 and a buffer 22, wherein the buffer 22 is coupled to the first GPU 21. In addition, the dotted line in the device 200 for generating GUI for displaying shown in FIG. 2 identifies multiple windows 20' and 20". Note that the modules with similar names in both the FIG. 1 and FIG. 2 are with similar structures and functionalities and thus detailed are omitted here for brevity.

The first GPU 21 separately draws pictures for generating the GUI into the windows 20' and 20", wherein at least one of the windows 20' is stored using a physical storage device with continuous physical address and thus can be directly stored in the buffer 22 without requiring the first CPU 21 to compose them to the buffer 22 once again. The first GPU 21 then composes the windows 20' drawing with the pictures stored in the buffer 22 and remaining windows 20" to generate the GUI. Note that the first GPU is 3D GPU. In consideration to the improvement made above, laboratory tests performed by the Applicants show that the system performance of the device 200 for generating the GUI for displaying is twice that of the current technology use to compose all windows in the buffer by the first GPU 21.

Figure 3:
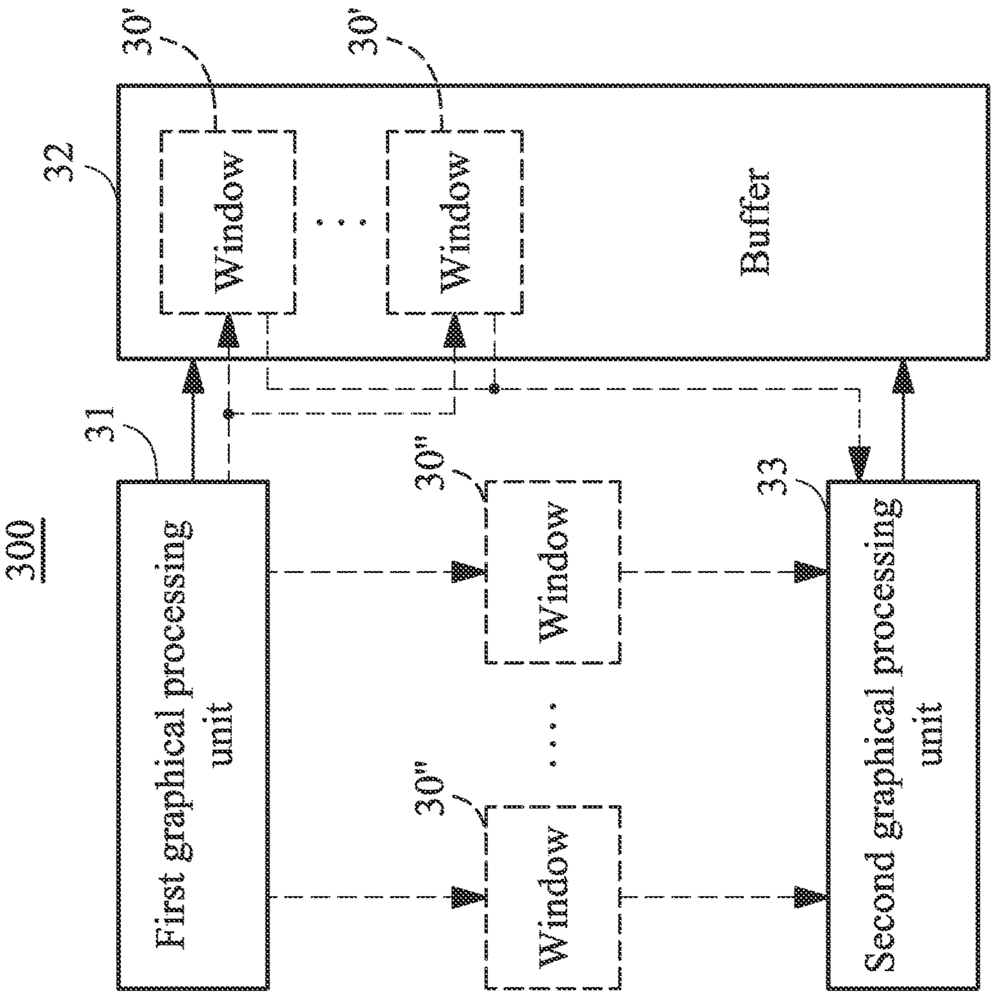
FIG. 3 is a schematic diagram illustrating a structure of a device for generating GUI for displaying according to the third embodiment of the invention.

FIG. 3 is a schematic diagram illustrating a structure of a device for generating GUI for displaying according to the third embodiment of the invention. As shown in FIG. 3, the device 300 for generating GUI for displaying comprises a first GPU 31, a buffer 32 and a second GPU 33, wherein the buffer 32 is coupled to the first GPU 31 and the second GPU 32. In addition, the dotted line in the device 300 for generating GUI for displaying shown in FIG. 3 identifies multiple windows 30' and 30". Note that the modules with similar names in both the FIG. 1 and FIG. 3 are with similar structures and functionalities and thus detailed are omitted here for brevity.

The first GPU 31 separately draws pictures for generating the GUI into the windows 30' and 30", wherein at least one of the windows 30' is stored using a physical storage device with continuous physical address and thus can be directly stored in the buffer 32 without requiring the first CPU 31 to compose them to the buffer 32 once again. The first GPU 31 then composes the windows 30' drawing with the pictures stored in the buffer 32 and remaining windows 30" to generate the GUI. Note that the first GPU 31 and the second GPU 32 are different. For example, the first GPU is 3D GPU and the second GPU is 2D GPU.

Figure 4:
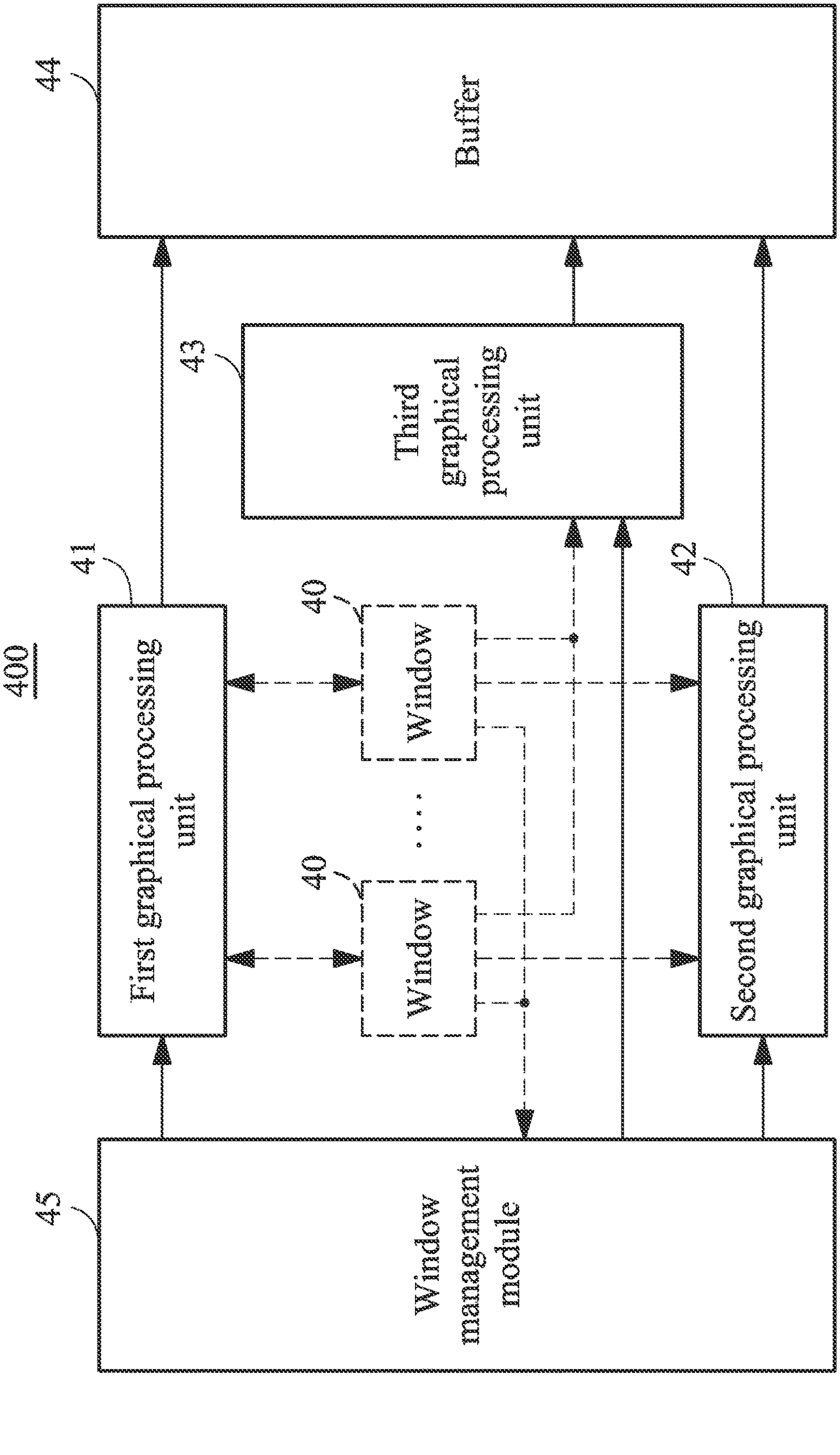
FIG. 4 is a schematic diagram illustrating a structure of a device for generating GUI for displaying according to the fourth embodiment of the invention.

FIG. 4 is a schematic diagram illustrating a structure of a device for generating GUI for displaying according to the fourth embodiment of the invention. As shown in FIG. 4, the device 400 for generating GUI for displaying comprises a first GPU 41, a second GPU 42, a third GPU 43, a buffer 44 and a window management module 45, wherein the buffer 44 is coupled to the first GPU 41, the second GPU 42 and the third GPU 43. In addition, the dotted line in the device 400 for generating GUI for displaying shown in FIG. 4 identifies multiple windows 40. The window management module 45 is coupled to the first GPU 41, the second GPU 42 and the third GPU 43, and the window management module 45 manages the windows 40 for selecting one of the first GPU 41, the second GPU 42 and the third GPU 43 to deal with pictures drawn in each window according to a predefined rule. Note that the modules with similar names in both the FIG. 1 and FIG. 4 are with similar structures and functionalities and thus detailed are omitted here for brevity.

The first GPU 41 separately draws pictures for generating the GUI into the windows 40. Then, the window management module 45 selects at least one of the first GPU 41, the second GPU 42 and the third GPU 43 according to the predefined rule to compose the windows 40 drawing with the pictures into the buffer 44 so as to generate the GUI. Note that, the first GPU 41 is 3D GPU, the second GPU 42 is 2D GPU and the third GPU 43 is IMGRZ (e.g. Image Resize).

The predefined rules may be set in advance based on the statuses of the first GPU, the second GPU and the third GPU, or the attributes of the windows. For example, the GUI of the application to be displayed usually contains multi-layer pictures, and thus the application usually draws the multi-layer pictures into the windows. Take the application that separately draws a first-layer pictures and a second-layer pictures in two widows as an example, if the widow with the first-layer picture and the window with the second-layer picture are recorded as the first window and the second window respectively, the copy function of the third GPU 43 will be selected to copy the first window drawing with the first-layer picture to the buffer. Then, when processing the second window drawing with the second-layer picture, either the first GPU 41 or the second GPU 42 can be selected to compose the first-layer picture copied in the buffer 44 and the second window drawing with the second-layer picture according to a workload of the first GPU 41 and the second GPU 42 and to store the composed pictures into the buffer 44, thereby the GUI of the application to be displayed will be stored in the buffer 44 for display.

Another example further shows that the windows 40 have different attributes, the attributes of the plurality of windows 40 can be used to set predefined rules. There are two specific types, as follows:

First type: the window management model 45 separately obtains window sizes of the windows drawing with pictures and based on the window sizes, selects at least one of the first GPU 41, the second GPU 42, and the third GPU 43 to compose the windows with the pictures.

Second type: the window management model 45 separately obtains the layer attributes of the windows drawing with pictures. The layer attributes are used to indicate a layer relationship of the windows. Then, based on the layer attributes, the window management model 45 selects at least one of the first GPU 41, the second GPU 42, and the third GPU 43 to compose the windows with pictures.

When the first type of the predefined rule is selected, the detail process for GUI displaying can be as follows.

For example, when the windows 40 comprise two windows, the first GPU 41 separately draws the pictures for generating the GUI into the two windows. Then, the window management module 45 separately obtains window sizes of the two windows drawing with the pictures, marks the two windows as a first window and a second window based on the window sizes of the two windows from large to small. After that, the window management module 45 selects the third GPU 43 to copy the first window to the buffer 44 and selects the second GPU 42 to compose the second window and the first window copied into the buffer 44 to generate the GUI.

When the second type of the predefined rule is selected, the detail process for GUI displaying can be as follows.

For example, when the windows 40 comprise two windows, the first GPU 41 separately draws the pictures for generating the GUI into the two windows. Then, the window management module 45 separately obtains the layer attributes of the two windows drawing with the pictures and sequentially marks the two windows as a lower-layer window and an upper-layer window according to the order of the layer attributes from bottom to top. After that, the window management module 45 selects the third GPU 43 to copy the lower-layer window to the buffer 44 and selects the second GPU 42 to compose the upper-layer window and the lower-layer window copied into the buffer 44 to generate the GUI.

For example, when the windows 40 comprise three windows, the first GPU 41 separately draws the pictures for generating the GUI into the three windows. Then, the window management module 45 separately obtains the layer attributes of the three windows drawing with the pictures and sequentially marks the three windows as a lower-layer window, a middle-layer window and an upper-layer window according to the order of the layer attributes from bottom to top. After that, the window management module 45 selects the third GPU 43 to copy the lower-layer window to the buffer 44, selects one of the first GPU 41 and the second GPU 42 to compose the middle-layer window and the lower-layer window copied into the buffer 44 to generate a composed picture to be stored in the buffer 44, and selects the other one of the first GPU 41 and the second GPU 42 to compose the upper-layer window and the composed picture stored in the buffer 44 so as to generate the GUI.

In view of the above, in this implementation, the system for generating the GUI for displaying can set the predefined rules based on the workload of the first GPU and the attributes of the windows drawing with pictures so as to select another module to replace the first GPU for copying and composing pictures in the buffer 44. When the first GPU 41 is required to copy pictures to the buffer 44, the third GPU 43 or the second GPU 42 may be selected to complete the copying. When the first GPU 41 is required to compose pictures to the buffer 44, the second GPU 42 may be selected to complete the composing. At the same time, the aforementioned predefined rules can also refer to the workload of the first GPU 41 to determine whether the workload has exceeded the predefined threshold value. The above examples are for illustration, and the invention is not limited thereto. The system applying the abovementioned system for generating the GUI for displaying can significantly reduce the workload of the first GPU, thereby significantly increasing the work performance of the system for generating the GUI for displaying.

Figure 5:
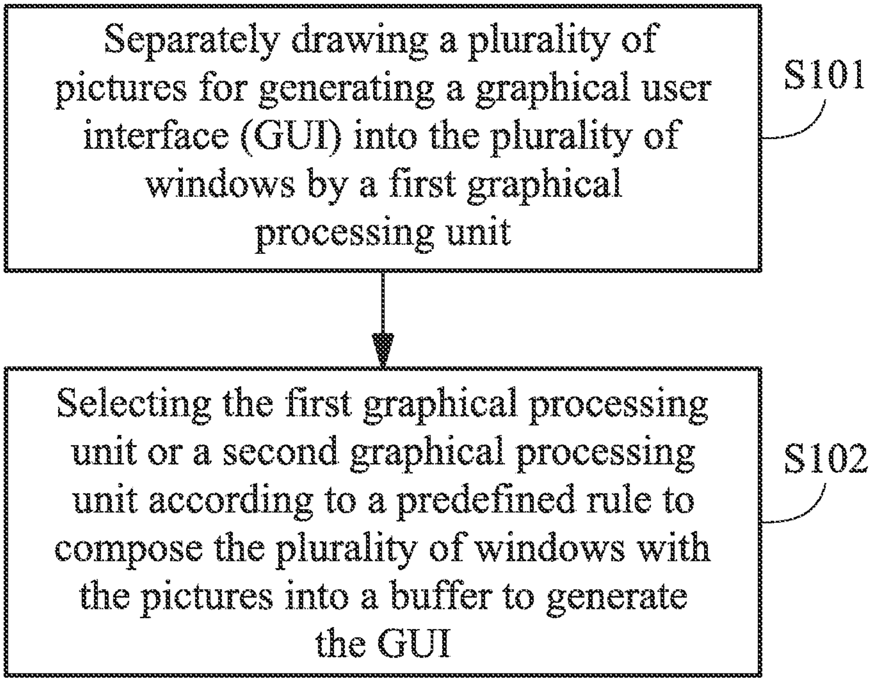
FIG. 5 is a schematic diagram illustrating a flowchart of a method for displaying a graphical user interface according to the first embodiment of the invention.

FIG. 5 is a schematic diagram illustrating a flowchart of a method for displaying a graphical user interface according to the first embodiment of the invention. It is to be noted that if it has substantially the same result, the invention is not limited to the process flow shown in FIG. 5. For example, the method shown in FIG. 5 can be performed by the device 100 for generating the GUI for displaying shown in FIG. 1. As shown in FIG. 5, the method comprises the following steps:

Step S101: separately drawing a plurality of pictures for generating the GUI into the plurality of windows by the first GPU; and Step S102: selecting the first GPU or a second GPU according to a predefined rule to compose the windows drawing with the pictures into a buffer to generate the GUI.

The windows were created by an application, wherein each window is a virtual window which corresponds to a virtual memory space visited by the corresponding virtual address. Generally, the GUI can be generated by mixing multiple-layer pictures, wherein the number of layers for the pictures in the GUI corresponds to the number of windows. The step of separately drawing the pictures for generating the GUI into the windows by the first GPU can be achieved by: writing, by the first GPU, the value of each pixel point of the picture in each layer of the GUI into a virtual memory space of the respective window.

In Step S102, the predefined rules can be specifically divided into four types, as follows:

First type: the second GPU is selected to compose the windows drawing with the pictures.

Second type: It is determined whether a utilization of the first GPU has exceeded a predetermined threshold. If it is determined that the utilization of the first GPU has exceeded the predetermined threshold, the second GPU is selected to compose the windows drawing with the pictures. If it is determined that the utilization of the first GPU has not exceeded the predetermined threshold, the first GPU is selected to compose the windows drawing with the pictures.

Third type: separately obtain window sizes of the windows drawing with the pictures and selects the first GPU or the second GPU to compose the windows drawing with the pictures according to the obtained window sizes of the windows.

Fourth type: separately obtain layer attributes of the windows drawing with the pictures, wherein the layer attributes indicate a layer relationship of the windows and then select the first GPU or the second GPU to compose the windows drawing with the pictures according to the obtained layer attributes of the windows.

To be more specific, when the predefined rule is the first type, the second GPU composes the windows drawing with the pictures to the buffer, thus reducing the processing load of the first GPU and enhancing the performance of the picture processing. When the predefined rule is the second type and when the utilization of the first GPU has exceeded the predefined threshold, the second GPU composes the windows drawing with the pictures into the buffer; when the utilization of the first GPU has not exceeded the predefined threshold, the first GPU will compose the windows drawing with the pictures into the buffer, which guarantees the first CPU has constantly worked under a suitable load and guarantees the performance of the picture processing.

The other two predetermined rules will be described in detail in the following embodiments.

In one embodiment, the buffer is a physical storage device with continuous physical address, which can directly read and write the stored content through the address and data buses. The step that composes the windows drawing with the pictures into a buffer by the first GPU or the second GPU to generate the GUI the first GPU 11 separately draws the pictures for generating the GUI into the windows 10 can be achieved by: recording the windows recorded as the first window, the second window, . . . , the $n^{th}$ window, respectively; copying, by the first GPU or the second GPU, the value of each pixel point in the pictures stored in the respective virtual memory space of the first window to the physical memory space of the buffer, separately composing the value of each pixel point in the pictures stored in the respective virtual memory space of the second window and the value of each pixel point in the first window which has already stored in the buffer and continually storing the composition result to the buffer; separately composing the value of each pixel point in the pictures stored in the respective virtual memory space of the third window and the value of each pixel point after the first window and the second window have been composed which has already stored in the buffer and continually storing the composition result to the buffer; . . . and so on, until the completion of the compose operation of the $n^{th}$ window. The GUI stored in the buffer will then be generated to be further displayed on the screen through the OSD. Note that the first GPU and the second GPU are different.

The first embodiment of the method for generating the GUI for displaying of the present invention can, by creating multiple windows, separately draw pictures for generating the GUI into the windows by the first GPU and select the first GPU or a second GPU according to a predefined rule to compose the windows drawing with the pictures into a buffer, thereby enhancing the performance of picture processing and increasing the frame rate of displaying GUI so as to allow the human eye to see continuous and smooth flowing frames on the screen.

Figure 6:
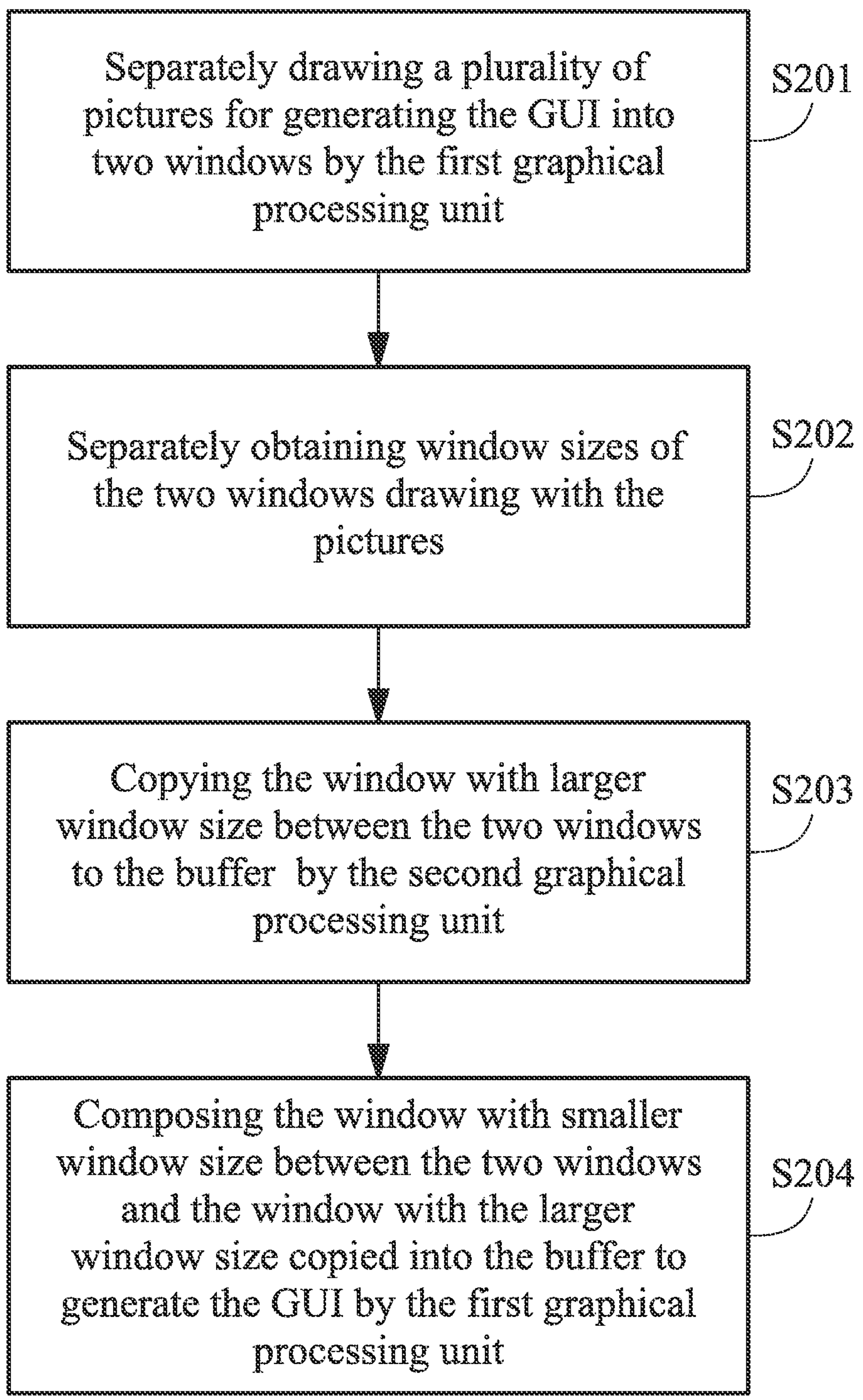
FIG. 6 is a schematic diagram illustrating a flowchart of a method for displaying a graphical user interface according to the second embodiment of the invention flowchart.

FIG. 6 is a schematic diagram illustrating a flowchart of a method for displaying a graphical user interface according to the second embodiment of the invention. It is to be noted that if it has substantially the same result, the invention is not limited to the process flow shown in FIG. 6. For example, the method shown in FIG. 6 can be performed by the device 100 for generating the GUI for displaying shown in FIG. 1. As shown in FIG. 6, the method comprises the following steps:

Step S201: separately drawing a plurality of pictures for generating the GUI into two windows by the first GPU; wherein the two windows were created by an application which respectively marks as a first window and a second window, wherein each of the first window and the second window is a virtual window which corresponds to a virtual memory space visited by the corresponding virtual address.

The GUI further comprises pictures with two layers, which respectively marks as a first-layer picture and a second-layer picture. The step of separately drawing the pictures for generating the GUI into the two windows by the first GPU can be achieved by: writing, by the first GPU, the value of each pixel point in the first-layer picture into a virtual memory space corresponding to the first window and the value of each pixel point in the second-layer picture into a virtual memory space corresponding to the second window. Note that the first GPU can be 3D GPU.

Step S202: separately obtaining window sizes of the two windows drawing with the pictures. In step S202, it is set that the first window and the second window are of different window sizes, the window size of the first window being larger than that of the second window.

Step S203: copying the window with larger window size between the two windows to the buffer by the second GPU. In step S203, the second GPU can copy the value of each pixel point of the first-layer picture stored in the virtual memory space of the first window to the physical memory space of the buffer. Note that the second GPU can be 2D GPU or IMGRZ.

Step S204: composing the window with smaller window size between the two windows and the window with the larger window size copied into the buffer to generate the GUI by the first GPU. In step S204, the first GPU can compose the value of each pixel point of the second-layer picture stored in the virtual memory space of the second window and the value of each pixel point of the first-layer picture copied into the buffer to generate the GUI so as to display it on the screen through OSD. In addition, when the second GPU is 2D GPU, step S204 can be altered to be performed by the second GPU to compose the window with smaller window size between the two windows and the window with the larger window size copied into the buffer.

The second embodiment of the method for generating the

GUI for displaying of the present invention can separately draw a the pictures for generating the GUI into two windows by the first GPU, separately copy the window with larger window size between the two windows to the buffer by the second GPU and compose the window with smaller window size between the two windows and the window with the larger window size copied into the buffer, thereby reducing the processing load of the first GPU and enhancing the performance of picture processing so as to allow the human eye to see continuous and smooth flowing frames on the screen.

Figure 7:
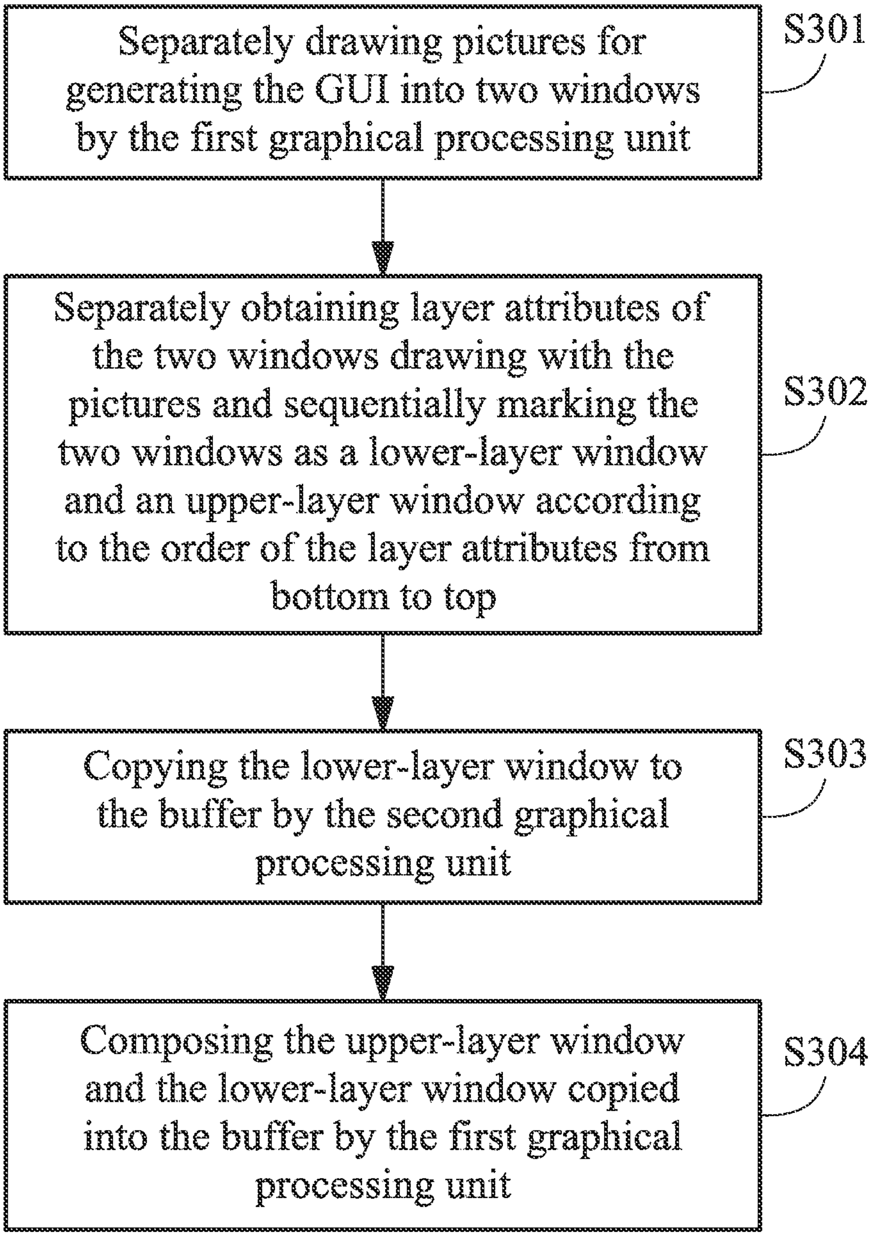
FIG. 7 is a schematic diagram illustrating a flowchart of a method for displaying a graphical user interface according to the third embodiment of the invention.

FIG. 7 is a schematic diagram illustrating a flowchart of a method for displaying a graphical user interface according to the third embodiment of the invention. This embodiment is based on two windows. It is to be noted that if it has substantially the same result, the invention is not limited to the process flow shown in FIG. 7. For example, the method shown in FIG. 7 can be performed by the device 100 for generating the GUI for displaying shown in FIG. 1. As shown in FIG. 7, the method comprises the following steps:

Step S301: separately drawing a plurality of pictures for generating the GUI into two windows by the first GPU; wherein the two windows were created by an application which respectively marks as a first window and a second window, wherein each of the first window and the second window is a virtual window which corresponds to a virtual memory space visited by the corresponding virtual address.

The GUI further comprises pictures with two layers, which respectively marks as a first-layer picture and a second-layer picture. The step of separately drawing the pictures for generating the GUI into the two windows by the first GPU can be achieved by: writing, by the first GPU, the value of each pixel point in the first-layer picture into a virtual memory space corresponding to the first window, and the value of each pixel point in the second-layer picture into a virtual memory space corresponding to the second window. Note that the first GPU can be 3D GPU.

Step S302: separately obtaining layer attributes of the two windows drawing with the pictures and sequentially marking the two windows as a lower-layer window and an upper-layer window according to the order of the layer attributes from bottom to top. In step S302, the layer attribute of the first window is set to be the lower-layer window while the layer attribute of the second window is set to be the upper-layer window. In another example, the two windows can be sequentially marked as the lower-layer window and the upper-layer window based on whether the layer attribute is relative to a background layer or a dynamic picture, wherein the lower-layer window corresponds to the background layer and the upper-layer window corresponds to the dynamic picture.

Step S303: copying the lower-layer window to the buffer by the second GPU. In step S303, the second GPU can copy the value of each pixel point of the first-layer picture stored in the virtual memory space of the lower-layer window (i.e. the first window) to the physical memory space of the buffer. Note that the second GPU can be 2D GPU or IMGRZ.

Step S304: composing the upper-layer window and the lower-layer window copied into the buffer by the first GPU. In step S304, the first GPU can compose the value of each pixel point of the second-layer picture stored in the virtual memory space of the upper-layer window (i.e. the second window) and the value of each pixel point of the first-layer picture copied into the buffer to generate the GUI so as to display it on the screen through OSD. In addition, when the second GPU is 2D GPU, step S304 can be altered to be performed by the second GPU to compose the upper-layer window and the lower-layer window copied into the buffer.

The third embodiment of the method for generating the GUI for displaying of the present invention can separately draw the pictures for generating the GUI into two windows by the first GPU, separately copy the lower-layer window to the buffer by the second GPU and compose the upper-layer window and the lower-layer window copied into the buffer by the first GPU, thereby reducing the processing load of the first GPU and enhancing the performance of picture processing so as to increase the frame rate for displaying the GUI and allow the human eye to see continuous and smooth flowing frames on the screen.

Figure 8:
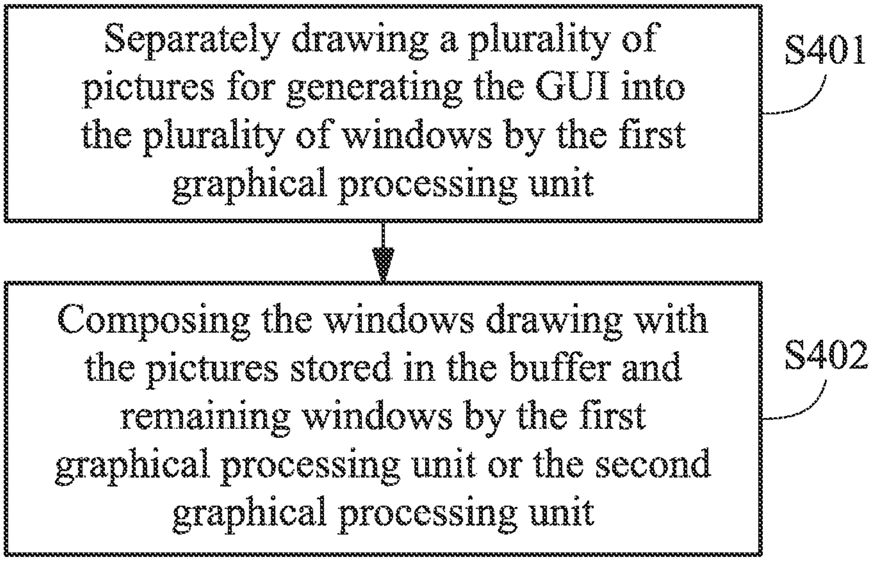
FIG. 8 is a schematic diagram illustrating a flowchart of a method for displaying a graphical user interface according to the fourth embodiment of the invention.

FIG. 8 is a schematic diagram illustrating a flowchart of a method for displaying a graphical user interface according to the fourth embodiment of the invention. It is to be noted that if it has substantially the same result, the invention is not limited to the process flow shown in FIG. 8. For example, the method shown in FIG. 8 can be performed by the device 300 for generating the GUI for displaying shown in FIG. 3.

As shown in FIG. 8, the method comprises the following steps:

Step S401: separately drawing a plurality of pictures for generating the GUI into the windows by the first GPU, wherein the at least one of the windows is stored in the buffer; and Step S402: composing the windows drawing with the pictures stored in the buffer and remaining windows by the first GPU or the second GPU.

In step S401, the windows comprise virtual windows and physical windows. The virtual window corresponds to a virtual memory space visited by the corresponding virtual address. The physical window corresponds to a physical memory space visited by the corresponding physical address, that is, the physical windows are stored in the buffer. The step of separately drawing the pictures for generating the GUI into the windows by the first GPU can be achieved by: writing, by the first GPU, the value of each pixel point of each layer picture in the GUI into a memory space corresponding to the responsive window. When the window is a virtual window, responsive virtual memory space will be written. When the window is a physical window, responsive physical memory space will be written, i.e., the buffer will be written.

For example, when the windows comprise two windows which respectively mark as a first window and a second window, the GUI comprises pictures with two layers, which respectively marks as a first-layer picture and a second-layer picture. Assuming that the first window is a virtual window and the second window is a physical window, the first GPU can write the value of each pixel point in the first-layer picture into a virtual memory space corresponding to the virtual window (i.e. the first window) and the value of each pixel point in the second-layer picture into a physical memory space corresponding to the physical window (i.e. the second window), that is, writing into the buffer.

In step S402, the value of each pixel point of the pictures stored in the virtual memory space corresponding to the virtual window and the value of each pixel point in the physical window stored in the buffer are composed to generate the GUI so as to display it on the screen through OSD.

As in above example, the value of each pixel point of the first-layer picture is read from the virtual memory space corresponding to the virtual window and is further composed to the value of each pixel point of the second-layer picture stored in the buffer to continually store the value of each pixel point obtained after composing into the buffer so as to display it on the screen through OSD.

The fourth embodiment of the method for generating the GUI for displaying of the present invention can separately draw the pictures for generating the GUI into the windows by the first GPU, wherein the at least one of the windows is stored in the buffer, and compose the windows drawing with the pictures stored in the buffer and remaining windows by the first GPU or the second GPU to generate the GUI. Since a portion of the pictures for generating the GUI are directly copied to the buffer, the picture copying for the portion of the pictures can be skipped, thus enhancing the performance of picture processing and the frame rate of the GUI, which will in turn allow the human eye to see continuous and smooth flowing frames on the screen.

Figure 9:
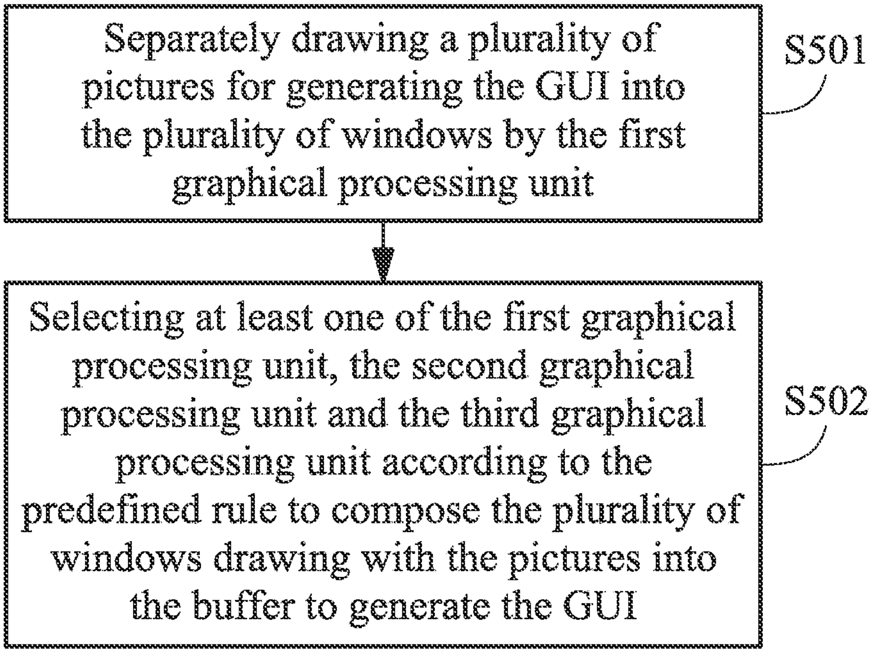
FIG. 9 is a schematic diagram illustrating a flowchart of a method for displaying a graphical user interface according to the fifth embodiment of the invention flowchart.

FIG. 9 is a schematic diagram illustrating a flowchart of a method for displaying a graphical user interface according to the fifth embodiment of the invention. It is to be noted that if it has substantially the same result, the invention is not limited to the process flow shown in FIG. 9. For example, the method shown in FIG. 9 can be performed by the device 400 for generating the GUI for displaying shown in FIG. 4. As shown in FIG. 9, the method comprises the following steps:

Step S501: separately drawing a plurality of pictures for generating the GUI into the plurality of windows by the first GPU; and Step S502: selecting at least one of the first GPU, the second GPU and the third GPU according to the predefined rule to compose the windows drawing with the pictures into the buffer to generate the GUI.

The windows were created by an application, wherein each window is a virtual window which corresponds to a virtual memory space visited by the corresponding virtual address. Generally, the GUI can be generated by mixing multiple-layer pictures, wherein the number of layers for the pictures in the GUI corresponds to the number of windows. In step S501, the step of separately drawing the pictures for generating the GUI into the windows by the first GPU can be achieved by: writing, by the first GPU, the value of each pixel point of the picture in each layer of the GUI into a virtual memory space of the respective window.

In step S502, the predefined rules may be set in advance based on the statuses of the first GPU, the second GPU and the third GPU, or the attributes of the windows. For example, the GUI of the application to be displayed usually contains multi-layer pictures, and thus the application usually draws the multi-layer pictures into the windows. Take the application that separately draws a first-layer picture and a second-layer picture in two widows as an example, if the widow with the first-layer picture and the window with the second-layer picture are recorded as the first window and the second window respectively, the copy function of the third GPU 43 can be selected to copy the first window drawing with the first-layer picture to the buffer. Then, when processing the second window drawing with the second-layer picture, either the first GPU or the second GPU can be selected to compose the first-layer picture copied in the buffer 44 and the second window drawing with the second-layer picture according to a workload of the first GPU and the second GPU and to store the composed pictures into the buffer, thereby the GUI of the application to be displayed will be stored in the buffer for display.

Other example further shows that the windows have different attributes, the attributes of the windows can be used to set predefined rules. For example, there are two specific types, as follows:

First type: window sizes of the windows drawing with pictures are separately obtained and based on the window sizes, at least one of the first GPU, the second GPU, and the third GPU selected to compose the windows with the pictures.

Second type: the layer attributes of the windows drawing with pictures are separately obtained. The layer attributes are used to indicate a layer relationship of the windows. Then, based on the layer attributes, at least one of the first GPU, the second GPU, and the third GPU is selected to compose the windows with pictures.

Figure 10:
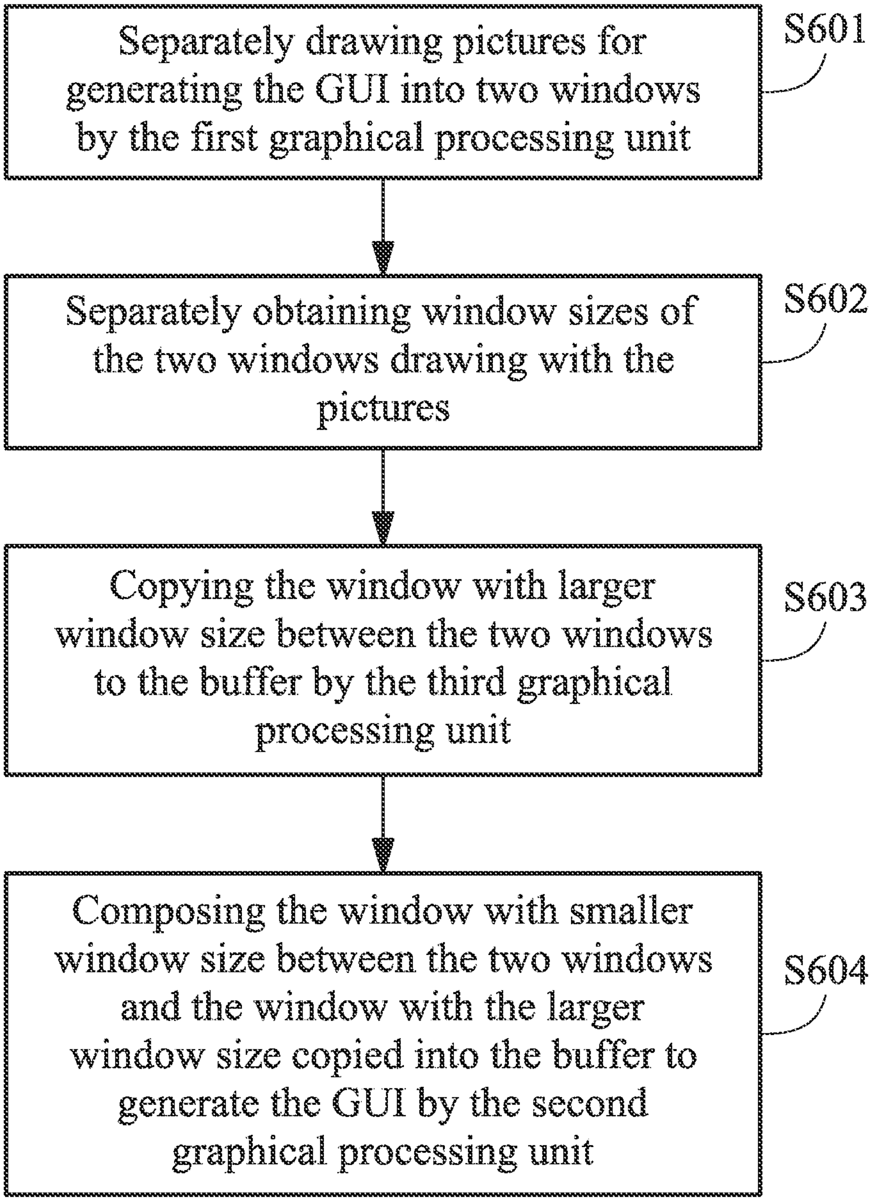
FIG. 10 is a schematic diagram illustrating a flowchart of a method for displaying a graphical user interface according to the sixth embodiment of the invention.
Figure 11:
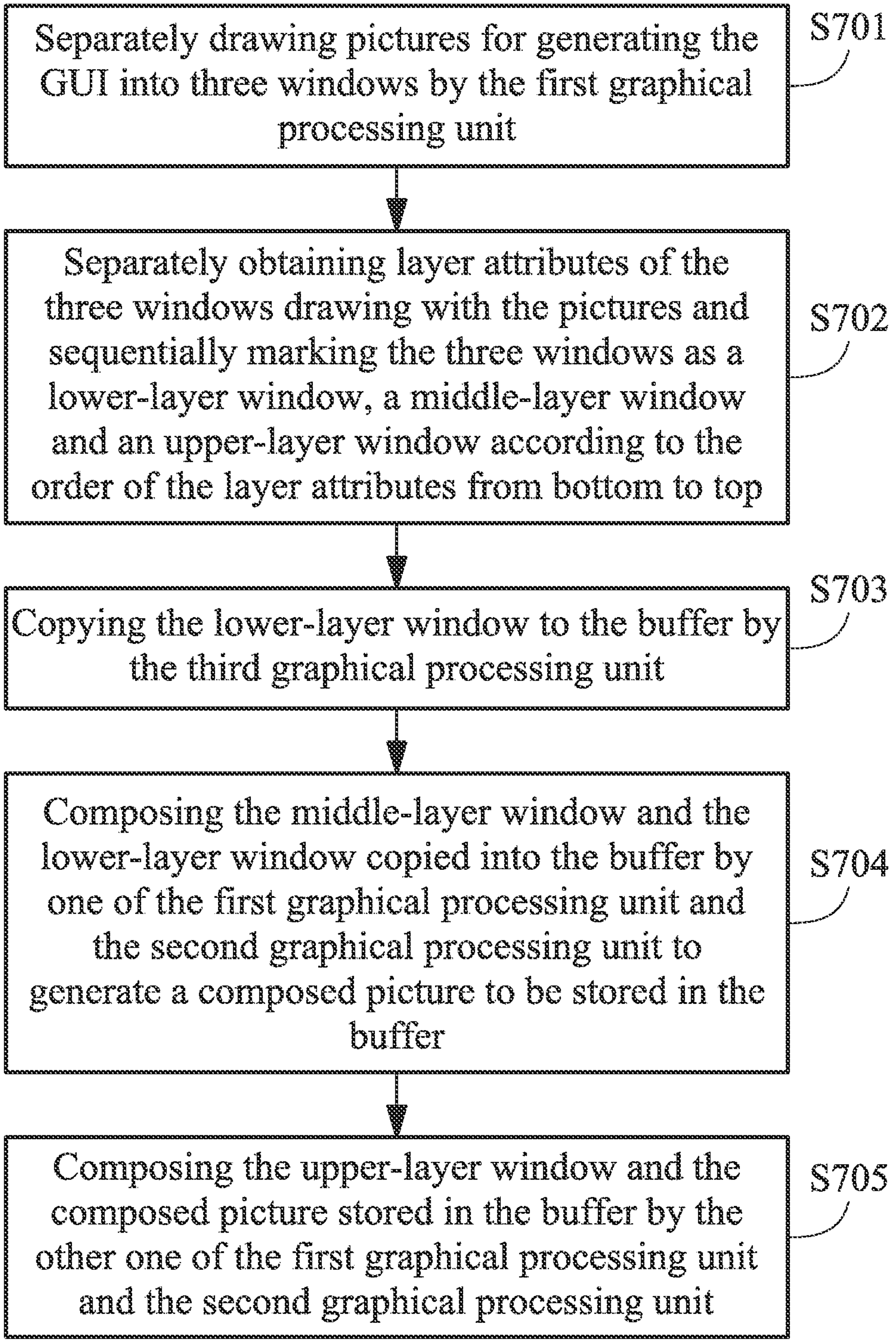
FIG. 11 is a schematic diagram illustrating a flowchart of a method for displaying a graphical user interface according to the seventh embodiment of the invention.

The two predefined rules are detailed in the method for generating GUI for displaying in FIG. 10 and FIG. 11. In particular, the buffer is a physical storage device with continuous physical address, which can directly read and write the stored content through the address and data bus. The specific steps for composing of the windows drawing with the pictures in the buffer are: values of the pixel points of the pictures stored in the virtual memory spaces corresponding to the windows are composed in the buffer, while the pixel point values obtained after composing are stored in the physical memory space of the buffer.

Note that the first GPU, the second GPU and the third GPU are different from each other.

The fifth embodiment of the method for generating the GUI for displaying of the present invention can, by creating multiple windows, separately draw pictures for generating the GUI into the windows by the first GPU and select at least one of the first GPU, the second GPU and the third GPU according to the predefined rule to compose the windows drawing with the pictures into the buffer, thus enhancing the performance of picture processing and the frame rate for displaying the GUI, which will in turn allow the human eye to see continuous and smooth flowing frames on the screen.

FIG. 10 is a schematic diagram illustrating a flowchart of a method for displaying a graphical user interface according to the sixth embodiment of the invention. This embodiment is based on two windows. It is to be noted that if it has substantially the same result, the invention is not limited to the process flow shown in FIG. 10. For example, the method shown in FIG. 10 can be performed by the device 400 for generating the GUI for displaying shown in FIG. 4. As shown in FIG. 10, the method comprises the following steps:

Step S601: separately drawing a plurality of pictures for generating the GUI into two windows by the first GPU; wherein the two windows were created by an application which respectively marks as a first window and a second window, wherein each of the first window and the second window is a virtual window which corresponds to a virtual memory space visited by the corresponding virtual address. The GUI further comprises pictures with two layers, which respectively marks as a first-layer picture and a second-layer picture. The step of separately drawing the pictures for generating the GUI into the two windows by the first GPU can be achieved by: writing, by the first GPU, the value of each pixel point in the first-layer picture into a virtual memory space corresponding to the first window and the value of each pixel point in the second-layer picture into a virtual memory space corresponding to the second window. Note that the first GPU can be 3D GPU.

Step S602: separately obtaining window sizes of the two windows drawing with the pictures. In step S602, it is set that the first window and the second window are of different window sizes, the window size of the first window being larger than that of the second window.

Step S603: copying the window with larger window size between the two windows to the buffer by the third GPU. In step S603, the second GPU can copy the value of each pixel point of the first-layer picture stored in the virtual memory space of the window with larger window size between the two windows (i.e. the first window) to the physical memory space of the buffer. Note that the third GPU can be IMGRZ. In addition, step S603 can further be altered to be performed by the second GPU 2D GPU to copy the window with larger window size between the two windows into the buffer.

Step S604: composing the window with smaller window size between the two windows and the window with the larger window size copied into the buffer to generate the GUI by the second GPU. In step S604, the second GPU can compose the value of each pixel point of the second-layer picture stored in the virtual memory space of the window with smaller window size between the two windows (i.e. the second window) and the value of each pixel point of the first-layer picture copied into the buffer to generate the GUI so as to display it on the screen through OSD. In addition, step S604 can further be altered to be performed by the first GPU to compose the window with smaller window size between the two windows and the window with the larger window size copied into the buffer. The sixth embodiment of the method for generating the GUI for displaying of the present invention can separately draw the pictures for generating the GUI into two windows by the first GPU, separately copy the window with larger window size between the two windows to the buffer by the third GPU and compose the window with smaller window size between the two windows and the window with the larger window size copied into the buffer by the second GPU, thereby reducing the processing load of the first GPU and enhancing the performance of picture processing and the frame rate for displaying the GUI so as to allow the human eye to see continuous and smooth flowing frames on the screen.

FIG. 11 is a schematic diagram illustrating a flowchart of a method for displaying a graphical user interface according to the seventh embodiment of the invention. This embodiment is based on three windows. It is to be noted that if it has substantially the same result, the invention is not limited to the process flow shown in FIG. 11. For example, the method shown in FIG. 11 can be performed by the device 400 for generating the GUI for displaying shown in FIG. 4.

As shown in FIG. 11, the method comprises the following steps:

Step S701: separately drawing a plurality of pictures for generating the GUI into three windows by the first GPU; wherein the three windows were created by an application which respectively marks as a first window, a second window and a third window, wherein each of the first window, the second window and the third window is a virtual window which corresponds to a virtual memory space visited by the corresponding virtual address.

The GUI further comprises pictures with three layers, which respectively marks as a first-layer picture, a second-layer picture and a third-layer picture. The step of separately drawing the pictures for generating the GUI into the three windows by the first GPU can be achieved by: writing, by the first GPU, the value of each pixel point in the first-layer picture into a virtual memory space corresponding to the first window, writing the value of each pixel point in the second-layer picture into a virtual memory space corresponding to the second window and writing the value of each pixel point in the third-layer picture into a virtual memory space corresponding to the third window. Note that the first GPU can be 3D GPU.

Step S702: separately obtaining layer attributes of the three windows drawing with the pictures and sequentially marking the three windows as a lower-layer window, a middle-layer window and an upper-layer window according to the order of the layer attributes from bottom to top. In step S702, the layer attribute of the first window is set to be the lower-layer window, the layer attribute of the second window is set to be the middle-layer window and the layer attribute of the third window is set to be the upper-layer window. In another example, the three windows can be sequentially marked as the lower-layer window, the middle-layer window and the upper-layer window based on whether the layer attribute is relative to a background layer or a dynamic picture, wherein the lower-layer window corresponds to the background layer, the middle-layer window corresponds to a first dynamic picture and the upper-layer window corresponds to a second dynamic picture.

Step S703: copying the lower-layer window to the buffer by the third GPU. In step S703, the third GPU can copy the value of each pixel point of the first-layer picture stored in the virtual memory space of the lower-layer window (i.e. the first window) to the physical memory space of the buffer. Note that the third GPU can be IMGRZ. In another example, step S703 can further be altered to be performed by the second GPU to copy the lower-layer window into the buffer, wherein the second GPU can be 2D GPU.

Step S704: composing the middle-layer window and the lower-layer window copied into the buffer by one of the first GPU and the second GPU to generate a composed picture to be stored in the buffer. In step S704, one of the first GPU and the second GPU can compose the value of each pixel point of the second-layer picture stored in the virtual memory space of the middle-layer window (i.e. the second window) and the value of each pixel point of the first-layer picture copied into the buffer to generate a composed picture and stores the composed picture into the buffer. Note that the second GPU can be 2D GPU.

Step S705: composing the upper-layer window and the composed picture stored in the buffer by the other one of the first GPU and the second GPU. In step S705, the other one of the first GPU and the second GPU can compose the value of each pixel point of the third-layer picture stored in the virtual memory space of the upper-layer window (i.e. the third window) and the value of each pixel point corresponding to the composed picture stored in the buffer to generate the GUI so as to display it on the screen through OSD.

The seventh embodiment of the method for generating the GUI for displaying of the present invention can first separately draw the pictures for generating the GUI into three windows by the first GPU, separately copy the lower-layer window to the buffer by the third GPU, compose the middle-layer window and the lower-layer window copied into the buffer by one of the first GPU and the second GPU to generate a composed picture to be stored in the buffer and finally composes the upper-layer window and the composed picture stored in the buffer by the other one of the first GPU and the second GPU, thereby reducing the processing load of the first GPU and enhancing the performance of picture processing so as to increase the frame rate for displaying the GUI and allow the human eye to see continuous and smooth flowing frames on the screen.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A method for generating a Graphical User Interface (GUI) for displaying, wherein the GUI is generated based on a plurality of windows, comprising:

separately drawing a plurality of pictures into the plurality of windows by a first graphical processing unit (GPU); and selecting the first GPU or a second GPU for each window according to a predefined rule to compose the plurality of windows drawing with the pictures into a buffer, such that the GUI is obtained;

wherein the first GPU and the second GPU are different; wherein the plurality of windows comprise two windows;

wherein the step of selecting the first GPU or the second GPU according to the predefined rule to compose the plurality of windows drawing with the pictures into the buffer further comprises:

separately obtaining the window sizes of the two windows drawing with the pictures;

copying the window with larger window size between the two windows to the buffer by the second GPU; and composing the window with smaller window size between the two windows and the window with the larger window size copied into the buffer to generate the GUI by the first GPU.

2. A device for generating Graphical User Interface (GUI) for displaying, comprising:

a first graphical processing unit (GPU), separately drawing a plurality of pictures for generating the GUI into a plurality of windows;

a second GPU; and a buffer, coupled to the first GPU and the second GPU;

a window management module, selecting the first graphical processing unit or the second graphical processing unit for each window according to a predefined rule to compose the plurality of windows drawing with the pictures into the buffer, wherein the first graphical processing unit and the second graphical processing unit are different;

wherein the plurality of windows comprise two windows and the window management module further separately obtains the window sizes of the two windows drawing with the pictures;

copying the window with larger window size between the two windows to the buffer by the second GPU; and composing the window with smaller window size between the two windows and the window with the larger window size copied into the buffer to generate the GUI by the first GPU.

3. A method for generating a Graphical User Interface (GUI) for displaying, wherein the GUI is generated based on a plurality of windows, comprising:

separately drawing a plurality of pictures into the plurality of windows by a first graphical processing unit (GPU); and selecting the first GPU or a second GPU for each window according to a predefined rule to compose the plurality of windows drawing with the pictures into a buffer, such that the GUI is obtained;

wherein the first GPU and the second GPU are different; wherein the plurality of windows comprise two windows;

wherein the step of selecting the first GPU or the second GPU according to the predefined rule to compose the plurality of windows drawing with the pictures into the buffer further comprises:

separately obtaining the layer attributes of the two windows drawing with the pictures and sequentially marking the two windows as a lower-layer window and an upper-layer window according to the order of the layer attributes from bottom to top;

copying the lower-layer window to the buffer by the second GPU; and composing the upper-layer window and the lower-layer window copied into the buffer by the first GPU.

4. The method of claim 3, wherein the predefined rule further comprises:

determining whether a utilization of the first GPU has exceeded a predetermined threshold;

if the utilization of the first GPU has exceeded the predetermined threshold, composing the plurality of windows drawing with the plurality of pictures by the second GPU.

5. The method of claim 3, wherein the first GPU is a three-dimensional GPU and the second GPU is a two-dimensional GPU.

6. The method of claim 3, wherein the first GPU is a three-dimensional GPU and the second GPU is a graphical-scaling processing unit.

7. A device for generating Graphical User Interface (GUI) for displaying, comprising:

a first graphical processing unit (GPU), separately drawing a plurality of pictures for generating the GUI into a plurality of windows;

a second GPU; and a buffer, coupled to the first GPU and the second GPU;

a window management module, selecting the first graphical processing unit or the second graphical processing unit for each window according to a predefined rule to compose the plurality of windows drawing with the pictures into the buffer, wherein the first graphical processing unit and the second graphical processing unit are different;

wherein the plurality of windows comprise two windows and the window management module further separately obtains the layer attributes of the two windows drawing with the pictures and sequentially marks the two windows as a lower-layer window and an upper-layer window according to the order of the layer attributes from bottom to top;

wherein the second GPU copies the lower-layer window to the buffer and the first GPU composes the upper-layer window and the lower-layer window copied into the buffer.

8. The device of claim 7, wherein the first GPU is a three-dimensional GPU and the second GPU is a two-dimensional GPU.

9. The device of claim 7, wherein the first GPU is a three-dimensional GPU and the second GPU is a graphical-scaling processing unit.

10. The device of claim 7, wherein the predefined rule further comprises the window management module determining whether a utilization of the first GPU has exceeded a predetermined threshold; and if the window management module determining that the utilization of the first GPU has exceeded the predetermined threshold, selecting the second GPU to compose the plurality of windows drawing with the plurality of pictures.

* * * * *